United States Patent [19]

Yoshida et al.

[11] Patent Number: 5,526,123
[45] Date of Patent: Jun. 11, 1996

[54] IMAGE COMMUNICATION APPARATUS AND METHOD FOR DETERMINING IMAGE QUALITY IN ACCORDANCE WITH RECEIVED LINE SYNCHRONIZATION SIGNALS

[75] Inventors: Takehiro Yoshida; Koichi Matsumoto, both of Tokyo; Toru Nakayama, Yokohama, all of Japan

[73] Assignee: Canon Kabushiki Kaisha, Tokyo, Japan

[21] Appl. No.: 376,379

[22] Filed: Jan. 23, 1995

Related U.S. Application Data

[63] Continuation of Ser. No. 93,659, Jul. 20, 1993, abandoned.

[30] Foreign Application Priority Data

Sep. 7, 1992 [JP] Japan .................. 4-238633

[51] Int. Cl.$^6$ ............................................. H04M 1/41
[52] U.S. Cl. ........................... 358/261.3; 358/427
[58] Field of Search ........................... 358/261.3, 426, 358/427, 432, 262.1; 382/43, 245–246; 348/403–404; H04N 1/41

[56] References Cited

U.S. PATENT DOCUMENTS

| | | | |
|---|---|---|---|
| 4,475,127 | 10/1984 | Iimuma | 358/465 |
| 4,829,524 | 5/1989 | Yoshida . | |
| 4,860,114 | 8/1989 | Horikawa et al. | 358/426 |
| 4,939,583 | 7/1990 | Tsubori et al. | 358/427 |
| 4,942,478 | 7/1990 | Yamagishi et al. . | |
| 5,031,179 | 7/1991 | Yoshida et al. . | |
| 5,172,246 | 12/1992 | Yoshida . | |
| 5,253,936 | 10/1993 | Ishida | 358/427 |
| 5,267,052 | 11/1993 | Bannai et al. . | |
| 5,291,303 | 3/1994 | Ishikawa | 358/427 |

FOREIGN PATENT DOCUMENTS 2166619  5/1986  United Kingdom .

*Primary Examiner*—Kim Yen Vu
*Attorney, Agent, or Firm*—Fitzpatrick, Cella, Harper & Scinto

[57] ABSTRACT

An image communication apparatus for receiving image data includes a first detector for detecting a first line synchronizing signal for one-dimensional codes in the received image data and a second detector for detecting a second line synchronizing signal for two-dimensional codes in the received image data. The apparatus counts the number of detected second line synchronizing signals in accordance with a detection by said first detector, and determines a quality of the received image data in accordance with that number of the second line synchronizing signals. In particular, the apparatus counts the number of the second line synchronizing signals detected between one first line synchronizing signal and a next first line synchronizing signal.

8 Claims, 17 Drawing Sheets

IMAGE COMMUNICATION APPARATUS AND METHOD FOR DETERMINING IMAGE QUALITY IN ACCORDANCE WITH RECEIVED LINE SYNCHRONIZATION SIGNALS

This application is a continuation of application Ser. No. 08/093,659 filed Jul. 20, 1993 now abandoned.

BACKGROUND OF THE INVENTION

1. Field of the Invention

The present invention relates to an image communication apparatus having the function of checking a communication error.

2. Related Background Art

One type of conventional facsimile apparatus determines the quality of received image data on the basis of the number of bits between one line synchronizing signal and a next line synchronizing signal when the conventional facsimile apparatus effects G3 image reception according to the T4 recommendation of the CCITT (International Telephone & Telegraph Consultative Committee). The conventional facsimile apparatus then decodes the received image data, discriminates whether the number of bits corresponding to one line of image data is a predetermined number or not (i.e. whether the received line is correct or not), and then determines the quality of the received image data in accordance with a ratio of the number of correct lines to the number of incorrect lines. The conventional facsimile apparatus informs a destination of the quality of the received image data each time one page has been received.

However, the conventional facsimile apparatus has some problems, as follows.

In the case where the conventional facsimile apparatus has a laser beam printer (LPB) or the like and where the conventional facsimile apparatus records one page of the received image data at a fixed high speed, the conventional facsimile apparatus records a previous page while the apparatus is simultaneously receiving a next page. As a result, the conventional facsimile apparatus has to perform in parallel one decoding operation for checking the quality of the page being received and another decoding operation for recording the previous page stored in a memory, and a controller of the conventional facsimile apparatus has to be complicated and expensive.

Further, coding methods used in G3 facsimile apparatus are the MH (Modified Huffman) method and the MR (Modified READ) method. The conventional facsimile apparatus is easily able to decode the MH code, which is a one dimensional coding method. However, in the case where the conventional facsimile apparatus decodes the MR code, which is a two dimensional coding method, the process of decoding the MR code is complicated because of the need to process both a reference line and a current line in parallel. Thereby, especially, the structure for decoding the MR codes is complicated in the conventional facsimile apparatus.

SUMMARY OF THE INVENTION

In consideration of the foregoing, an object of the present invention is to provide an improvement in this type of image communication apparatus.

Another object of the present invention is to provide an image communication apparatus capable of determining the quality of received image data without decoding all of the received image data.

Another object of the present invention is to provide a method which is easily able to check the quality of received image data.

These and other objects are accomplished by providing an image communication apparatus comprising means for counting a number of second line synchronizing signals for two-dimensional codes between one first line synchronizing signal for one-dimensional codes and a next first line synchronizing signal, and for determining the quality of received image data in accordance with a count value of the second line synchronizing signals.

Still other objects of the present invention, and the advantages thereof, will become fully apparent from the following description of the preferred embodiments to be taken in conjunction with the attached drawings.

DETAILED DESCRIPTION OF THE PREFERRED EMBODIMENTS

Now the present invention will be clarified in detail by embodiments thereof shown in the attached drawings.

Figure 1:
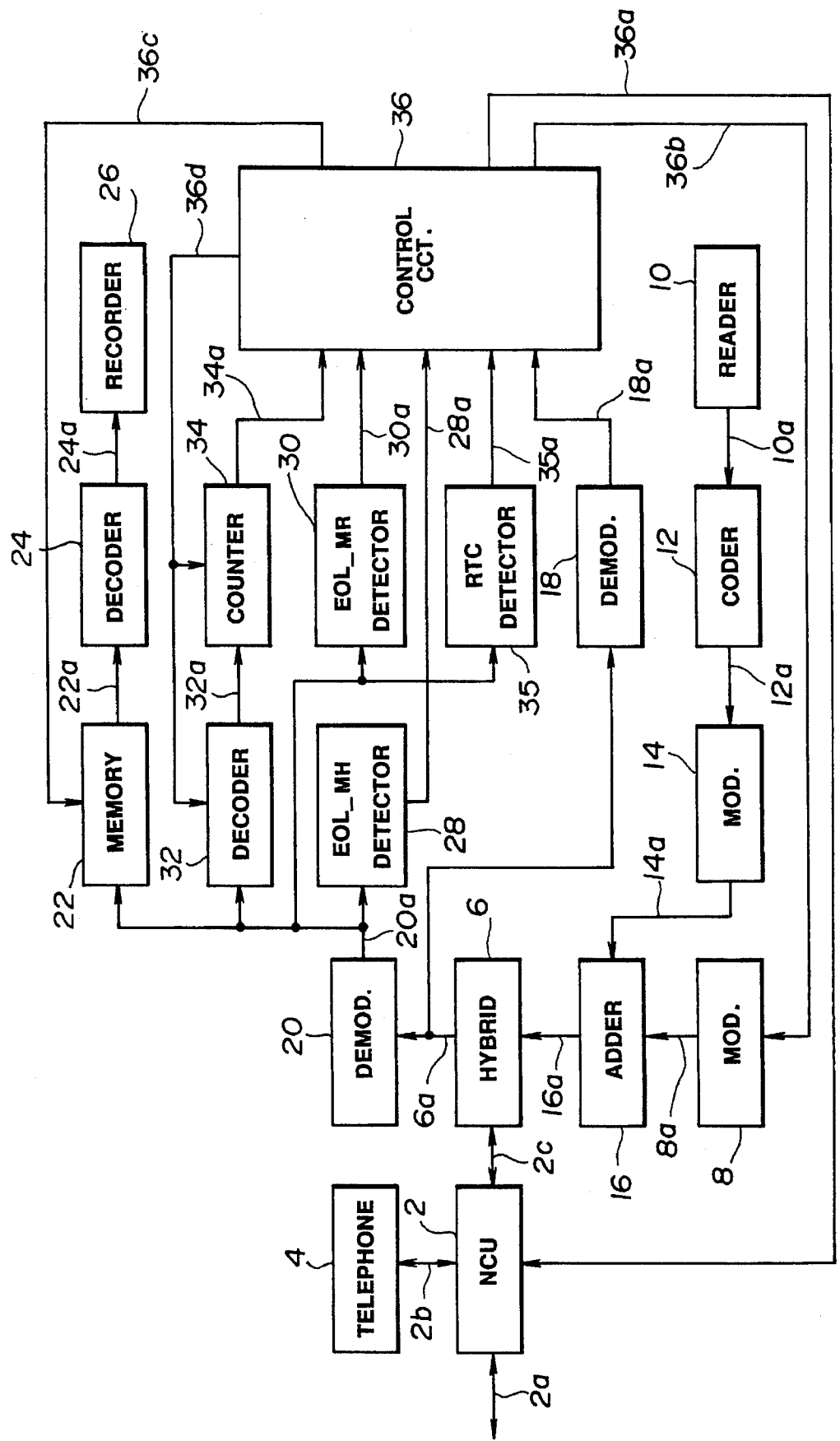
FIG. 1 is a block diagram of a facsimile apparatus according to a first embodiment of the present invention.

FIG. 1 is a block diagram of a facsimile apparatus according to the first embodiment. The facsimile apparatus according to the first embodiment detects the EOL (End Of Line signal) corresponding to the MH code (the EOL-MH) and the EOL corresponding to the MR code (the EOL-MR), and determines the quality of received image data in accordance with the number of the EOL-MRs.

In FIG. 1, an NCU (Network Control Unit) 2 is provided for connecting to and using a telephone network for data and other communication. The NCU 2 has a relay CML (unshown) for making connections. The NCU 2 connects a telephone line 2a to the facsimile terminal, controls connections between the telephone line 2a and a telephone 4 or a hybrid circuit 6, and maintains a closed loop. In particular, the NCU 2 connects the telephone line 2a to the telephone 4 when the signal level of a signal line 36a from a control circuit 36 is "0". On the other hand when the signal level of the signal line 36a is "1", the NCU 2 connects the telephone line 2a to the facsimile terminal, which is constituted by all the elements in FIG. 1 except the NCU2 and the telephone 4. In a normal condition or initial condition, the telephone line 2a is connected to the telephone 4.

The hybrid circuit 6 is provided for separating the transmitting signal and receiving signal. In other words, the hybrid circuit 6 sends the transmitting signal from an adder 16 to the telephone line 2a via the NCU 2, and transfers the receiving signal from another station via the NCU 2 to a demodulator 18 and a demodulator 20.

A modulator 8 is provided for modulating protocol signals from the control circuit 36. The modulator 8 modulates signals based on the V21 recommendation of CCITT.

A reading unit 10 is provided for reading image information of the original document line by line of main scanning, and for outputting signals having two values: white and black. The reading unit 10 is structured with an imaging device such as a CCD (Charge Coupled Device), an optical system and so on. The reading unit 10 also has a sensor for detecting a next original sheet to be sent, and provides information whether the next original sheet is present or not to the control circuit 36.

A coding circuit 12 is also provided for coding information read by the reading circuit 8. The MH coding method and the MR coding method are advantageously used by the coding circuit 12.

A modulator 14 is provided for modulating image data based on the V27ter (differential phase modulation) or V29 (orthogonal modulation) recommendation of CCITT.

The adder 16 is provided for adding outputs of the modulator 8 and 14.

The demodulator 18 is provided for demodulating protocol signals based on the V21 recommendation of CCITT.

The demodulator 20 is provided for demodulating a received data signal based on the recommendation V27ter or V29 of CCITT.

A memory circuit 22 is provided for storing image data demodulated by the demodulator 20 into an applicable area. The memory circuit 22 stores the demodulated image data into the applicable area in accordance with a control signal from the control circuit 36. Further the memory circuit 22 outputs the image data to a decoding circuit 24 in accordance with the control signal from the control circuit 36.

The decoding circuit 24 is provided for decoding (MH decoding or MR decoding) the demodulated image data from the memory circuit 22.

A recording unit 26 is provided for recording decoded image data from the decoding circuit 24 on a recording material sequentially and line by line. The recording unit 26 records the image data at a fixed speed, and is, for example, an LBP.

A EOL-MR detecting circuit 28 is provided for detecting a line synchronizing signal of the MH mode (EOL-MH) out of the demodulated image data. When the EOL-MH detecting circuit 28 detects the EOL-MH, the EOL-MH detecting circuit 28 outputs a detection signal to the control circuit 36. The EOL-MH consists of at least eleven consecutive "0"s and two following "1"s. The EOL-MH detecting circuit 28 detects the above mentioned pattern of "0"s and "1"s.

A EOL-MR detecting circuit 30 is provided detecting a line synchronizing signal of the MR mode (EOL-MR) out of the demodulated image data. When the EOL-MR detecting circuit 30 detects the EOL-MR, the EOL-MR detecting circuit 30 outputs a detection signal to the control circuit 36. The EOL-MR consists of at least eleven consecutive "0"s and a following "10". The EOL-MR detecting circuit 30 detects the above mentioned pattern of "0"s and "1".

A MH decoding circuit 32 is provided for decoding the demodulated image data in accordance with the MH decoding method. The MH decoding circuit 32 decodes the demodulated image data in response to a start pulse from the control circuit 36, and continues to decode the demodulated image data until the next EOL-MH is detected.

A counter 34 is provided for counting the number of bits of the image data decoded by the MH decoding circuit 32 in response to the start pulse from the control circuit 36. The count value of the counter 34 is supplied to the control circuit 36.

A RTC detecting circuit 35 is provided for detecting an RTC (Return To Control) out of the demodulated image data. The RTC consists of six consecutive EOLs (each EOL consists of at least eleven consecutive "0"s and a following "1"). When the RTC detecting circuit 35 detects the RTC, the RTC detecting circuit 35 outputs a detection signal to the control circuit 36.

The control circuit 36 is provided for controlling all circuits mentioned above and the total system of this facsimile apparatus, and is structured with a CPU, memories, and other conventional elements.

The operation of the control circuit 36 is as follows.

In the case where the facsimile apparatus receives image data in a MR mode at the normal resolution (K=2), the control circuit 36 discriminates if an EOL-MR is detected between one EOL-MH and a next EOL-MH or not. The control circuit 36 counts the numbers of EOL-MRs detected by the EOL-MR detecting circuit 30 during a period which is from a detection of one EOL-MH to a detection of the next EOL-MH to give a count value S. In the case of the MR mode at the normal resolution (K=2), one line of MH codes and one line of MR codes alternately are received. Therefore, if the count value S is "1", the control circuit 36 increments a count value a, and if the count value S is not "1", the control circuit 36 increments a count value b. When the RTC is detected by the RTC detecting circuit 35, the control circuit 36 compares b/(a+b) with a predetermined value c. In the case of b/(a+b)≦c, the control circuit 36 determines that the received image data corresponding to one page has been of fine quality, and in the case of b/(a+b)>c, the control circuit 36 determines that the received image data corresponding to one page has not been of fine quality.

In the case where the facsimile apparatus receives image data in a MR mode at the fine resolution (K=4), the control circuit 36 discriminates if the count value S is "3" or not. If the count value S is "3", the control circuit 36 increments the count value a, and if the count value S is not "3", the control circuit 36 increments the count value b.

In the case where the facsimile apparatus receives image data in a MR mode at the super-fine resolution (K=8), the control circuit 36 discriminates if the count value S is "7" or not. If the count value S is "7", the control circuit 36 increments the count value a, and if the count value S is not "7", the control circuit 36 increments the count value b.

The control circuit 36 determines the quality of the received data corresponding to one page in the manner mentioned above, and then sends a response signal corresponding to the result of the determination in response to a signal in a Q signal from a transmitting station.

The Q signal is MPS (Multi-Page Signal), EOM (End of Message), or EOP (End of Procedure), and the response signal is MCF (Message Confirmation) or RTN (Retain Negative), etc.

Next, the receiving operation of this embodiment is explained as follows.

Figure 2:
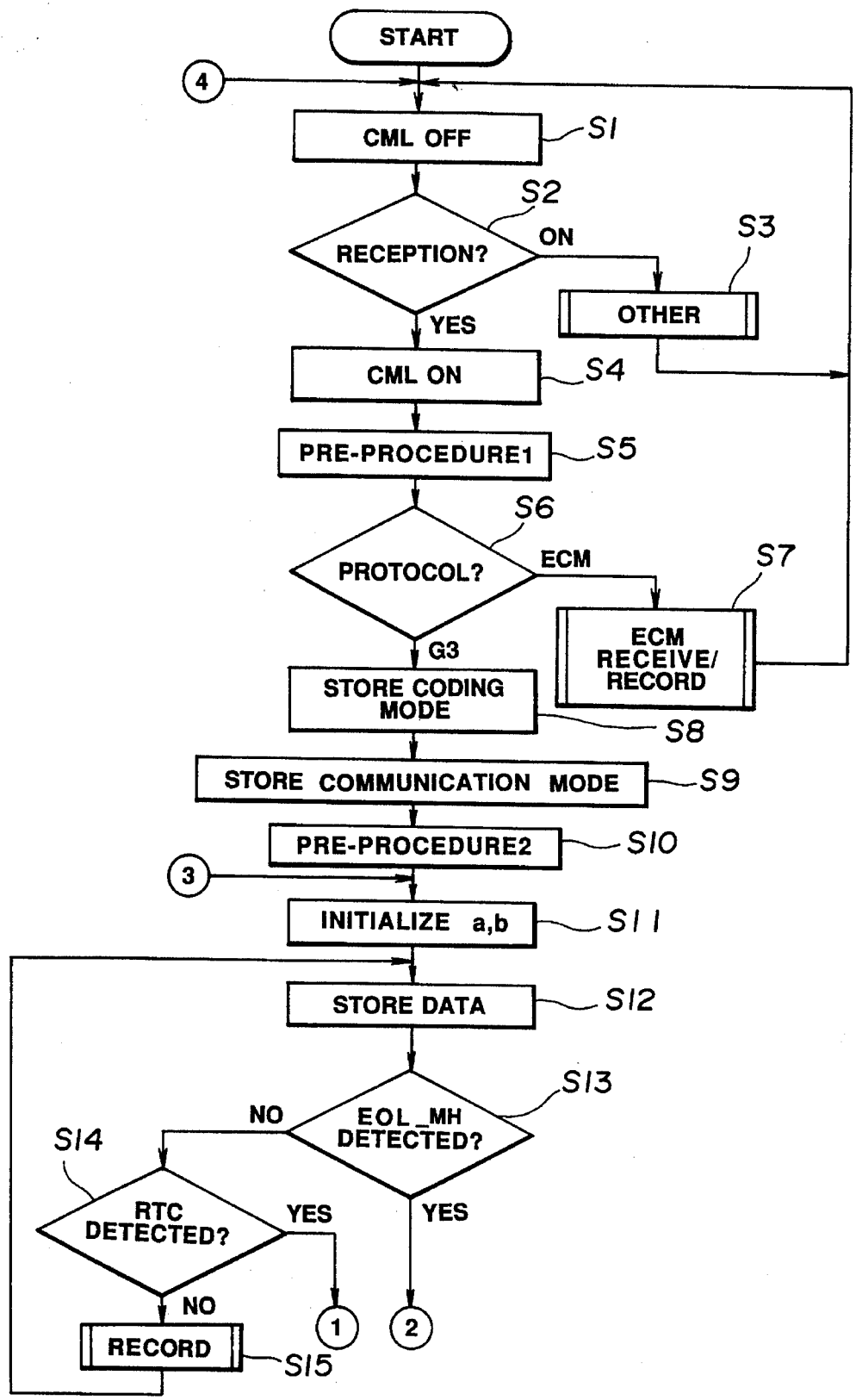
FIG. 2 through FIG. 4 together form a flow chart showing a control operation according to the first embodiment.
Figure 3:
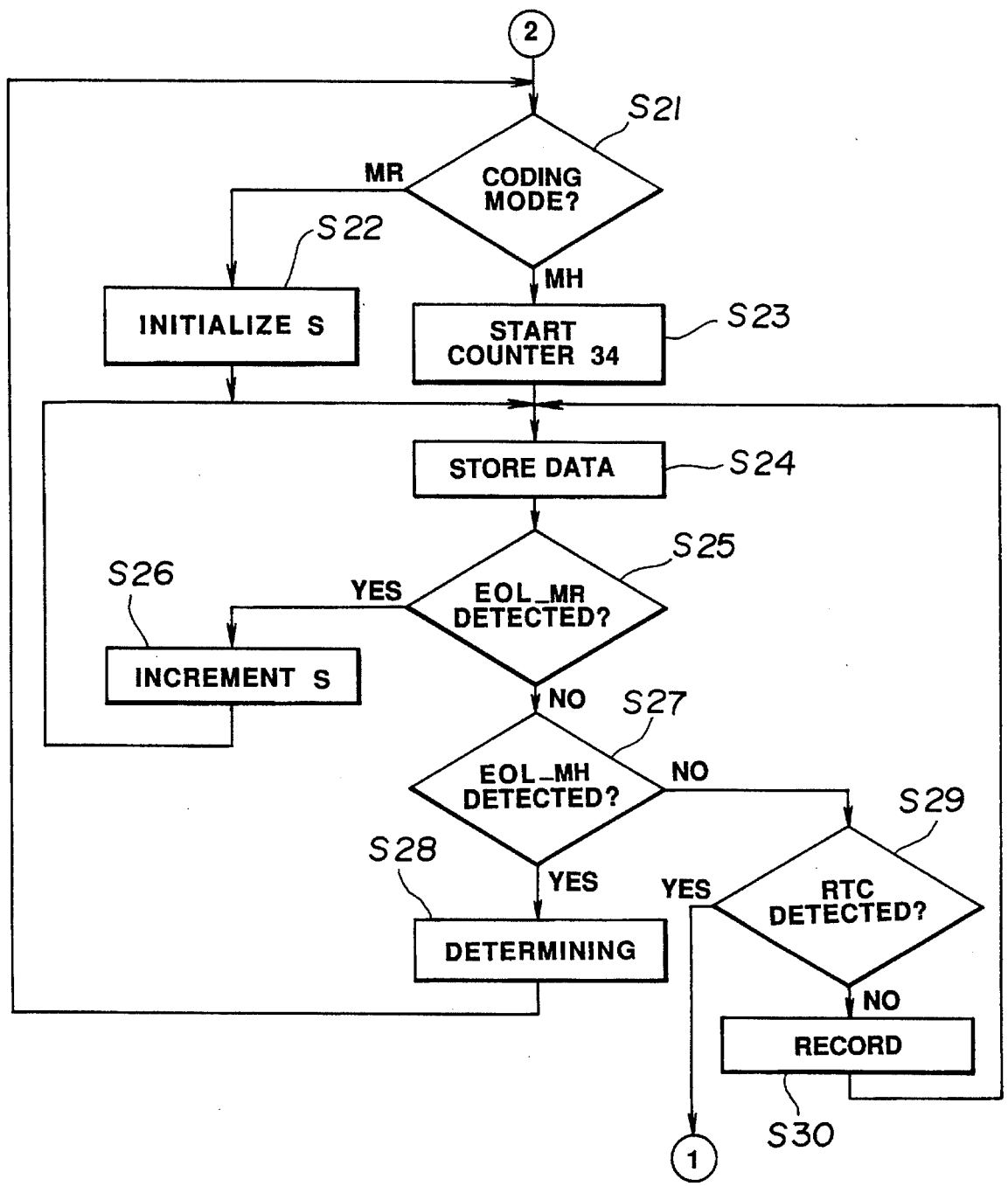
Figure 4:
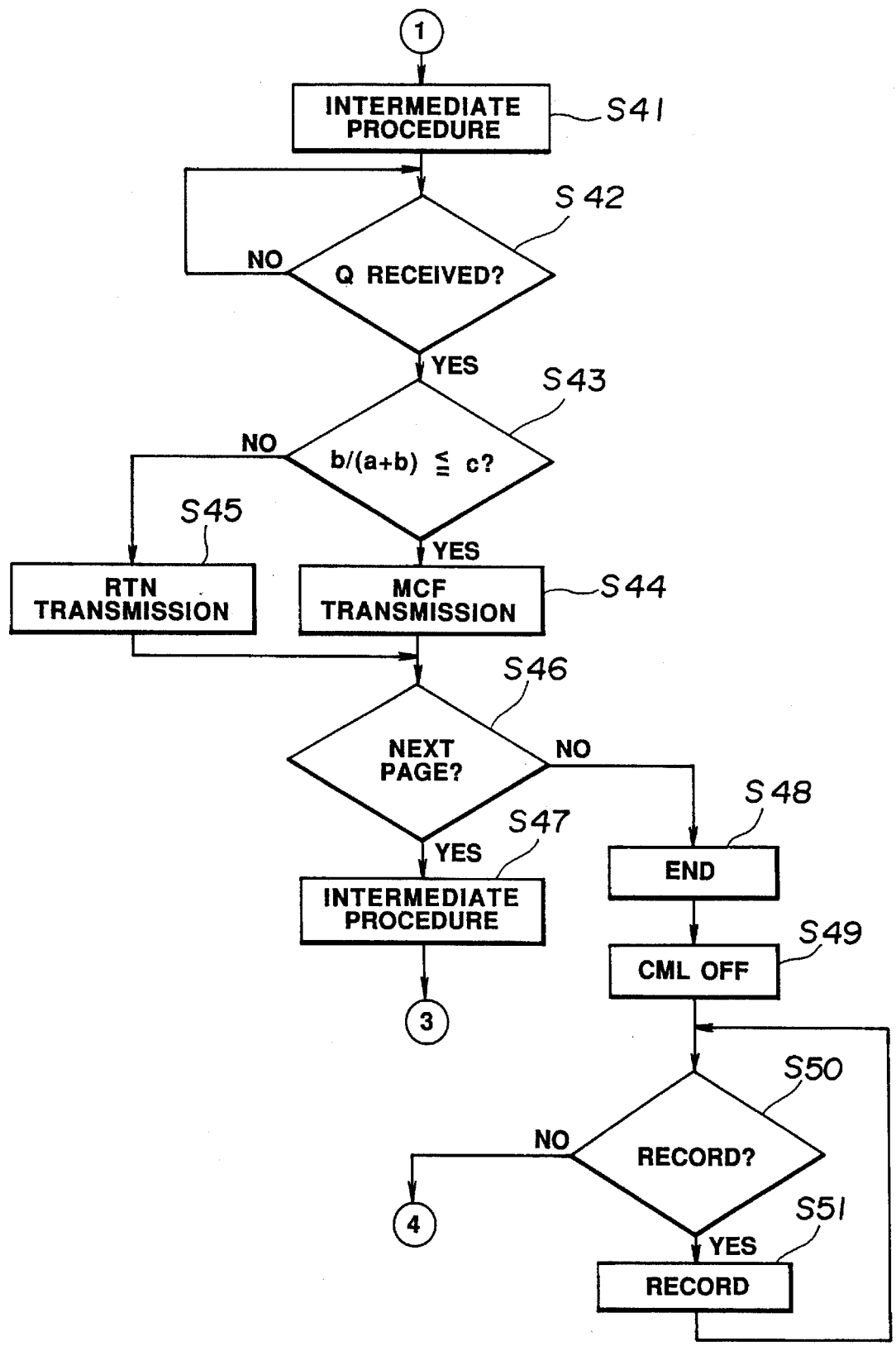

FIGS. 2 through 4 together form a flow-chart showing a method of controlling processes by the control circuit 36.

The control circuit 36 initializes the relay CML of the NCU2 to connect the telephone line 2a to the telephone 4 by setting the signal line 36a to be "0" (S1). The control circuit 36 discriminates if image reception has been selected or not (S2). If image reception has not been selected, the control circuit 36 effects other processes (S3), and then returns to step S1.

If image reception has been selected, the control circuit 36 turns on the relay CML of the NCU2 by setting the signal line 36a to be "1" so as to connect the telephone line 2a to the facsimile terminal (S4). Then the control circuit 36 effects a pre-procedure for setting a communication mode (S5), and discriminates whether G3 image reception or an ECM (Error Correction Mode) image reception has been selected in the pre-procedure (S6). If ECM image reception has been selected, the control circuit 36 effects the ECM image reception, and records received image data (S7), and then returns to step S1. In the ECM image reception, image data is communicated by using a HDLC (High-level Data Link Control) format. Therefore, the control circuit 36 detects communication errors by checking specific flags according to the HDLC format without decoding the received image data in the ECM image reception.

In the case where G3 image reception has been selected in step S6, the control circuit 36 analyzes a FIF (Facsimile Information Field) of DCS (Digital Command Signal) received in the pre-procedure, and stores information, which indicates a coding mode and which is discriminated by the analysis, into an internal memory of the control circuit 36 (S8). The coding mode can be the MH mode, the MR mode, or a MMR (Modified Modified READ) mode, etc. Then the control circuit 36 analyzes a FIF of NSS (Non-Standard Set-up)/TSI (Transmitting Subscriber Identification) received in the pre-procedure, and stores information, which indicates a transmission mode and which is discriminated by the analysis, into the internal memory (S9). The information of the transmission mode includes resolution information (normal resolution, fine resolution, or super-fine resolution), etc.

The control circuit 36 completes the pre-procedure (S10), and them initializes the internal counters a and b (S11). The counter a is a counter for counting the number of times a correct number of EOL-MRs is detected between one EOL-MH and the next EOL-MH, and the counter b is a counter for counting the number of times an incorrect number of EOL-MRs is detected between one EOL-MH and the next EOL-MH.

Next, the control circuit 36 stores the demodulated image data into the memory circuit 22 (S12), and discriminates if an EOL-MH is detected by the EOL-MH detecting circuit 28 or not (S13). In the case where an EOL-MH is not detected, the control circuit 36 discriminates if an RTC is detected by the RTC detecting circuit 35 or not (S14). In the case where the RTC is detected, the control circuit 36 shifts from step S14 to step S41 of FIG. 4. In the case where an RTC is not detected, the control circuit 36 performs a recording operation of FIG. 6 (S15), and then returns to step S12.

On the other hand, in the case where the EOL-MH is detected in step S13, the control circuit 36 discriminates (FIG. 3) whether the coding mode is the MH mode or the MR mode (S21). In the case where the coding mode is the MR mode, the control circuit 36 clears the counter s (S22), and then shifts to step S24. The counter s is an internal counter of the control circuit 36 for counting the number of EOL-MRs. In the case where the coding mode is the MH mode, the control circuit 36 starts the count operation of the counter 34 (S23), and then shifts to step S24.

The control circuit 36 stores the demodulated image data (the received image data) into the memory circuit 22 (S24), and discriminates if an EOL-MR is detected by the EOL-MR detecting circuit 30 or not (25). In the case where the EOL-MR is detected, the control circuit 36 increments the count value S of the counter s (S26), and then returns to step S24. On the other hand, in the case where an EOL-MR is not detected, the control circuit 36 discriminates if an EOL-MH is detected or not (S27). In the case where the EOL-MH is detected, the control circuit 36 performs a determining operation of FIG. 5 (S28), and then returns the step S21. On the other hand, in the case where an EOL-MH is not detected in step S27, the control circuit 36 discriminates if the RTC is detected or not (S29). In the case where the RTC is detected, the control circuit 36 shifts from step S29 to step S41 of FIG. 4. On the other hand, in the case where an RTC is not detected, the control circuit 36 performs the recording operation of FIG. 6 (S30), and then returns to step S24.

In the case where the RTC is detected in step S15 or step S29, the control circuit 36 performs an intermediate procedure for informing the transmitting station of the quality of the received image data (S41), and then waits to receive the Q signal (MPS, EOM, or EOP) in step S42. After receiving the Q signal, the control circuit 36 compares $b/(a+b)$ with a predetermined value c (S43). In the case of $b/(a+b) \leq c$, the control circuit 36 sends the MCF to the transmitting station (S44). On the other hand, in the case of $b/(a+b) \geq c$, the control circuit 36 sends the RTN to the transmitting station (S45).

Next, the control circuit 36 discriminates if there is data corresponding to a next page to be received (S46). In the case where there is data of the next page, the control circuit 36 completes the intermediate procedure (S47), and then returns to step S11. On the other hand, in the case where there is no data of a next page, the control circuit 36 performs an end procedure (S48), and then initializes the relay CML of the NCU2 (S49).

Next, the control circuit 36 discriminates if there is received image data to be recorded (S50). In the case where there is received image data to be recorded, the control circuit 36 causes the recording unit 26 to record the received image data stored in the memory circuit 22 page by page (S51). In the case where all the received image data has been recorded, the control circuit 36 returns to step S1 of FIG. 2.

In step S41, step S44, step S45, step S47, and step S48 of FIG. 4, the control circuit 36 performs the above mentioned process and the recording operation (FIG. 6) as follows.

Figure 5:
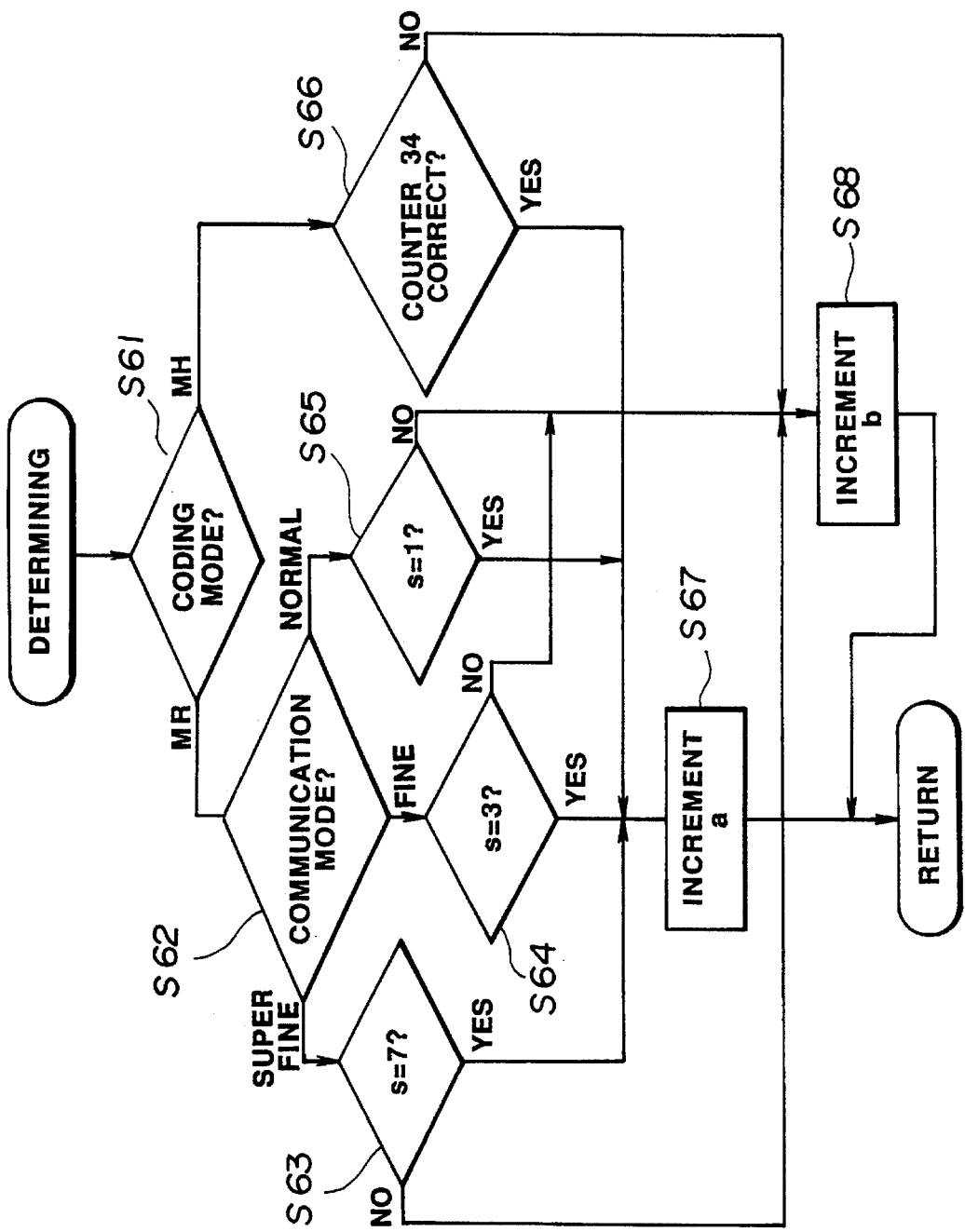
FIG. 5 is a flow chart showing a "determining" subroutine from step S28 in FIG. 3.

FIG. 5 is a flow chart showing the "determining" subroutine for determining whether the number of EOL-MRs is correct for a particular interval. In FIG. 5, the control circuit 36 discriminates whether the coding mode is the MH mode or the MR mode (S61). In the case where the coding mode is the MH mode, i.e. the one-dimensional mode, the control circuit 36 checks if a count value of the counter 34 (number of bits of decoded image data) is a predetermined value or not (S66). The predetermined value corresponds to the fixed number of pixels of one line (e.g. in case of A4 size: 1,728, in case of B4 size: 2,048). When the count value of the counter 34 is the predetermined value in step S66, the control circuit 36 increments the internal counter a (S67) (i.e. correct), and then returns to the main flow chart shown in FIG. 2 through FIG. 4. On the other hand, when the count value of the counter 34 is not the predetermined value in step S66, the control circuit 36 increments the internal counter b (S68) (i.e. incorrect), and then returns to the main flow chart.

On the other hand, in the case where the coding mode is the two-dimensional MR mode, the control circuit discriminates whether the resolution of the transmitting mode is the normal resolution, fine resolution, or super-fine resolution (S62). In the case where the resolution of the transmitting mode is the normal resolution, the control circuit 36 discriminates if the count value of the counter s is "1" or not (S65). In the case where the resolution of the transmitting mode is the fine resolution, the control circuit 36 discriminates if the count value of the counter s is "3" or not (S64). In the case where the resolution of the transmitting mode is the superfine resolution, the control circuit 36 discriminates if the count value of the counter s is "7" or not (S63). When the count value of the counter s is the correct value ("1", "3" or "7") in step S63, step S64 or step S65, the control circuit 36 increments the internal counter a (S67). On the other hand, when the count value of the counter s is not the correct value ("1", "3" or "7"), the control circuit 36 increments the internal counter b (S68). Then the control circuit 36 returns to the main flow.

Figure 6:
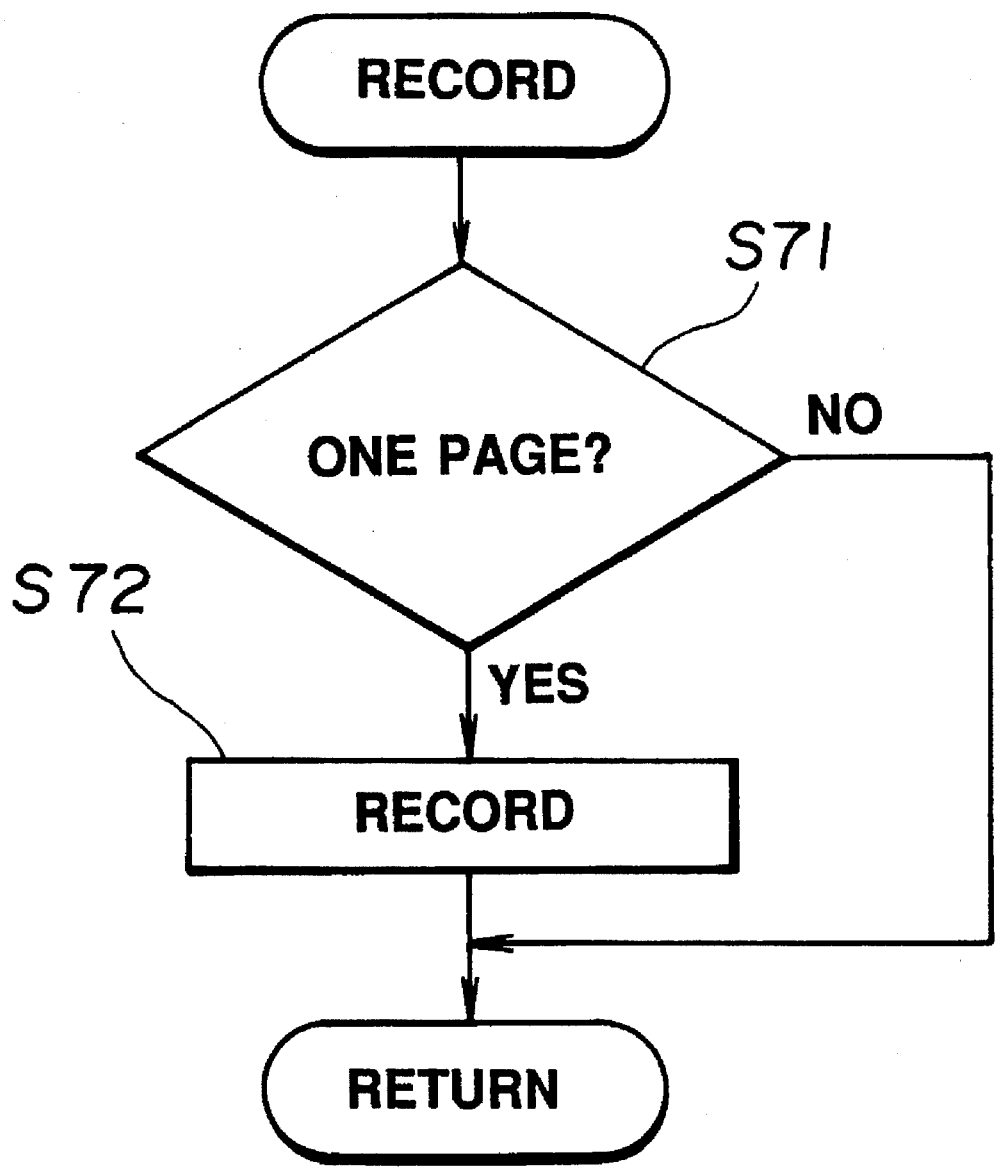
FIG. 6 is a flow chart showing a "recording" subroutine from steps S15 and S30 in FIG. 2 and FIG. 3.

FIG. 6 is a flow chart showing a "recording" subroutine. In FIG. 6, the control circuit 36 discriminates whether the received image data corresponding to at least one page has been stored in the memory circuit 22 or not (S71). In the case where the received image data of at least one page has been stored in the memory circuit 22, the control circuit 36 causes the recording unit 26 to record the stored image data in page units, i.e. page by page (S72), and then returns to the main flow of FIG. 2 through FIG. 4. In the recording operation mentioned above, the decoding unit 24 decodes the received image data from the memory circuit 22, and sends decoded image data to the recording unit 26. The recording unit 26 records the decoded image data at the fixed speed. In this embodiment, the image data is continuously received, and the received image data is stored in the memory circuit 22, and then the stored image data is recorded by the recording unit 26. The facsimile apparatus according to the first embodiment mentioned above can determine the quality of the received MR coded image data, by the combination of the detection of the EOL-MH, the detection of the EOL-MR, and the MH decoding operation, without decoding the MR coded image data according to the MR decoding method.

Further, in the facsimile apparatus according to the first embodiment, the structure of decoding the MR codes is simpler and cheaper than the one of the prior art.

Further, as above mentioned, the predetermined value c in step S43 of FIG. 4 is fixed regardless of the resolution (K=2, 4, 8). But the predetermined value c might be modified to be changed corresponding to each resolution (K=2, 4, 8) of image data. In the first embodiment, the parameter K of the MR coding method is previously set in accordance with the resolution of image data (i.e. normal resolution: K=2, fine resolution: K=4, super-fine resolution: K=8). However, this parameter might be modified to be set in the pre-procedure.

Next, a facsimile apparatus according to a second embodiment of the present invention will be described as follows. The facsimile apparatus according to the second embodiment detects the EOL-MH and the EOL-MR, and further checks the number of bits of one decoded line of the MH codes. Then the apparatus determines the quality of the received image data in accordance with the number of the EOL-MRs and the number of bits of the decoded line of the MH codes.

The structure of the facsimile apparatus according to the second embodiment is similar to FIG. 1, but the control circuit 36 performs a different control operation in the second embodiment. The control circuit 36 counts the numbers of the detected EOL-MRs and checks this count value in response to the detection of the EOL-MH in the same manner as the first embodiment. Further, the control circuit 36 checks whether the count value of the counter 34 (the number of bits of one decoded line of the MH codes) is the predetermined value (e.g. A4 size: 1728, B4 size: 2048, etc.) or not. Then the control circuit 36 counts the number d of lines having the predetermined value and the number e of lines not having the predetermined value. Then the control circuit compares $b/(a+b)$ with a predetermined value c, and further compares $e/(d+e)$ with a predetermined value f in response to a detection of the RTC. In the case of either $b/(a+b)>c$ or $e/(d+e)>f$, the control circuit 36 determines that the quality of the received image data is bad. In the case of $b/(a+b) \leq c$ and $e/(d+e) \leq f$, the control circuit 36 determines that the quality of the received image data is good.

FIG. 7 through FIG. 10 together form a flow chart showing a control operation of the control circuit 36 in the second embodiment. FIG. 7, FIG. 8, FIG. 9 and FIG. 10 correspond to FIG. 2, FIG. 3, FIG. 4 and FIG. 5, respectively. In FIG. 7 through FIG. 10, the steps which involve same operations as FIG. 2 through FIG. 5 are identified with the same numbers, and explanations thereof are omitted.

Figure 7:
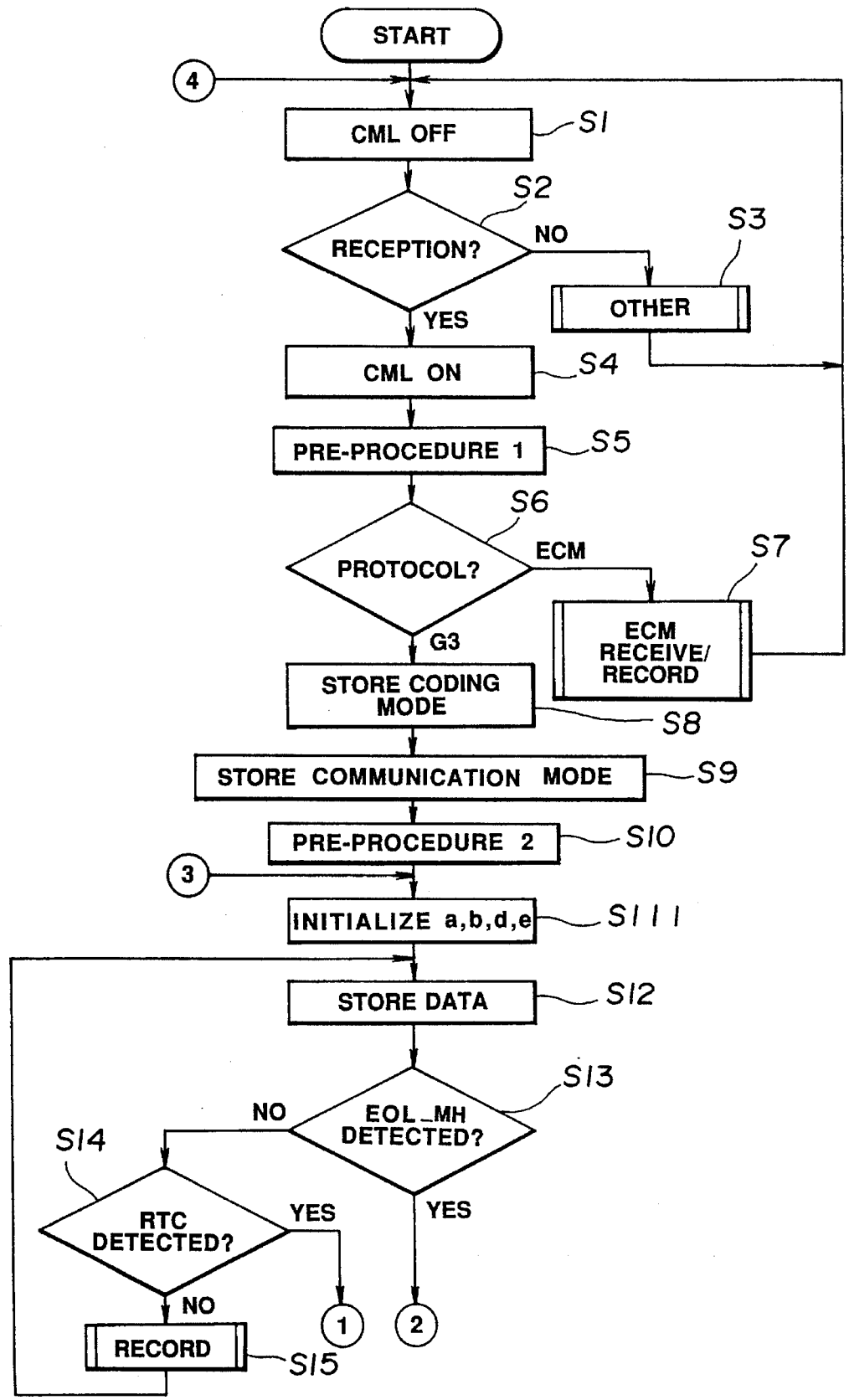
FIG. 7 through FIG. 9 together form a flow chart showing a control operation according to a second embodiment.

In step S111 of FIG. 7, the control circuit 36 initializes internal counters a, b, d and e. The internal counter a is a counter which counts the number of detections of the correct number of EOL-MRs between one EOL-MH and the next EOL-MH. The internal counter b is a counter which counts the number of detections of an incorrect number of EOL-MRs between one EOL-MH and the next EOL-MH. The internal counter d is a counter which counts the number of lines (lines of MH codes) having the correct number of bits, and the internal counter e is a counter which counts the number of lines (lines of MH codes) having the incorrect number of bits.

Figure 8:
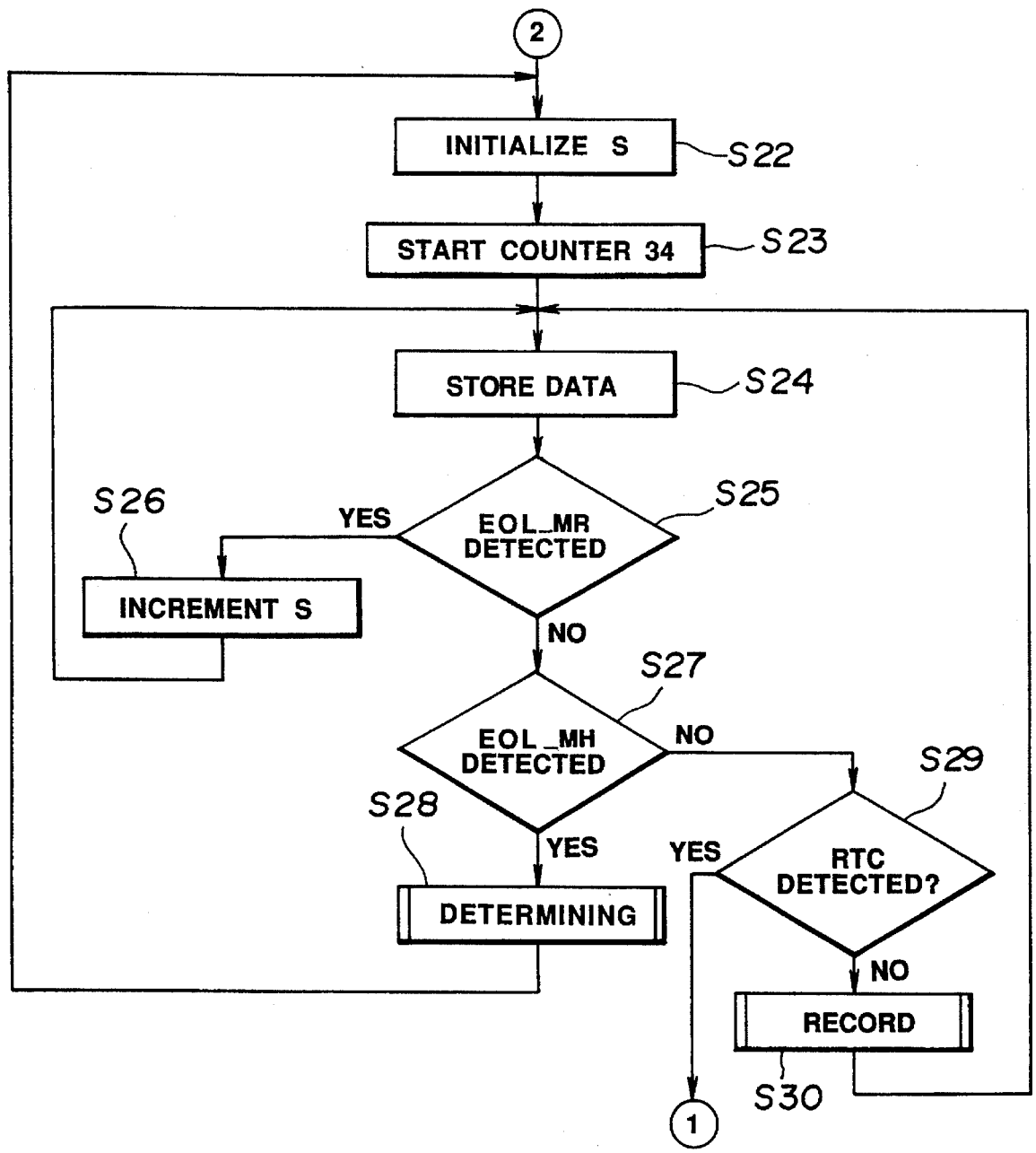

In FIG. 8, the control circuit 36 performs step S22 and step S23 irrespective of the coding mode.

Figure 9:
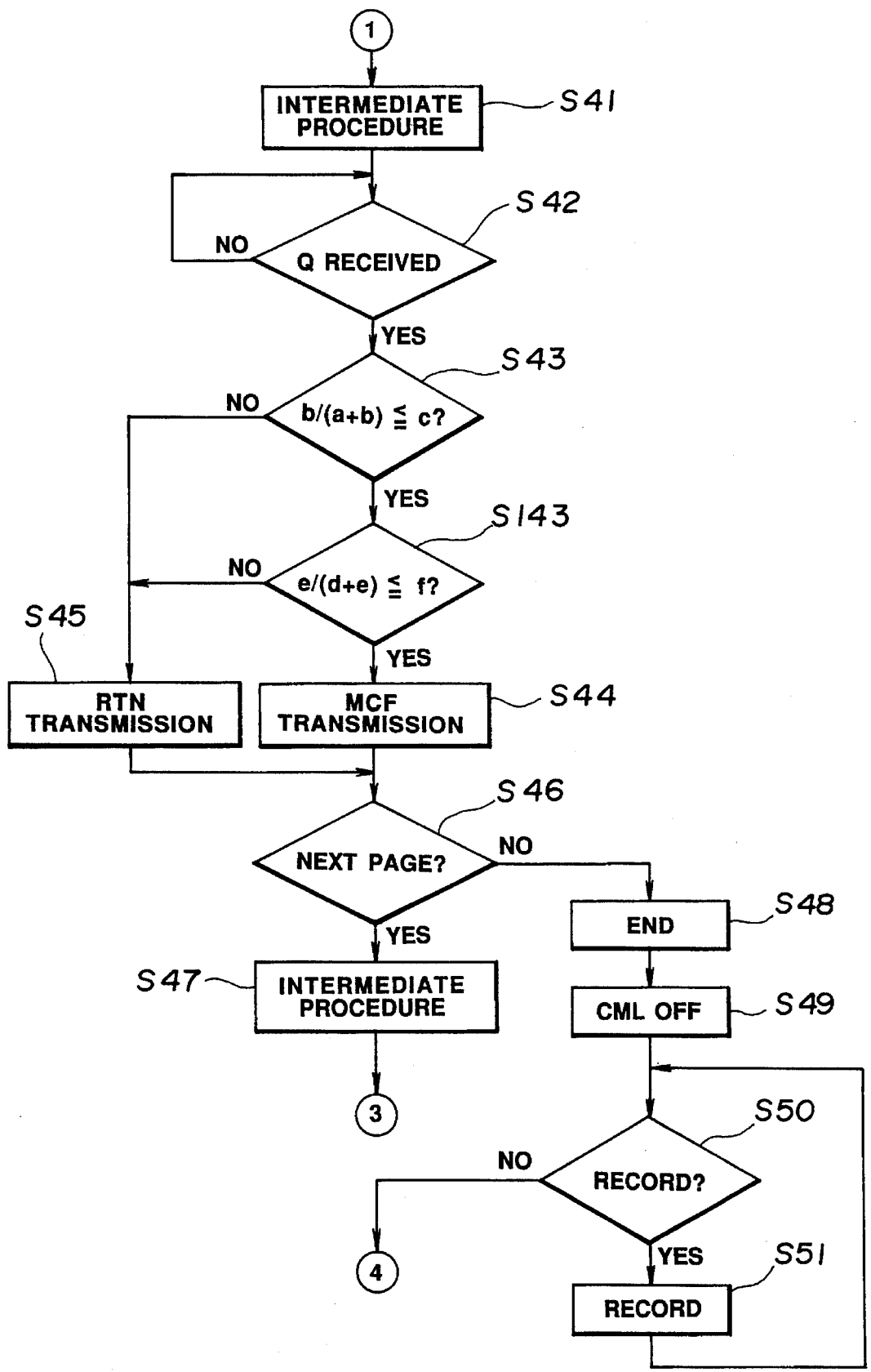

In step S43 of FIG. 9, the control circuit 36 compares $b/(a+b)$ with the predetermined value c. In the case of $b/(a+b) \leq c$, the control circuit 36 shifts from step S143 to step S144. In the case of $b/(a+b)>c$, the control circuit 36 shifts from step S43 to step S45. In step S143, the control circuit 36 compares $e/(d+e)$ with the predetermined value f. In the case of $e/(d+e) \leq f$, the control circuit 36 shifts from step S143 to step S44. In the case of $e/(d+e)>f$, the control circuit 36 shifts to step S45.

Figure 10:
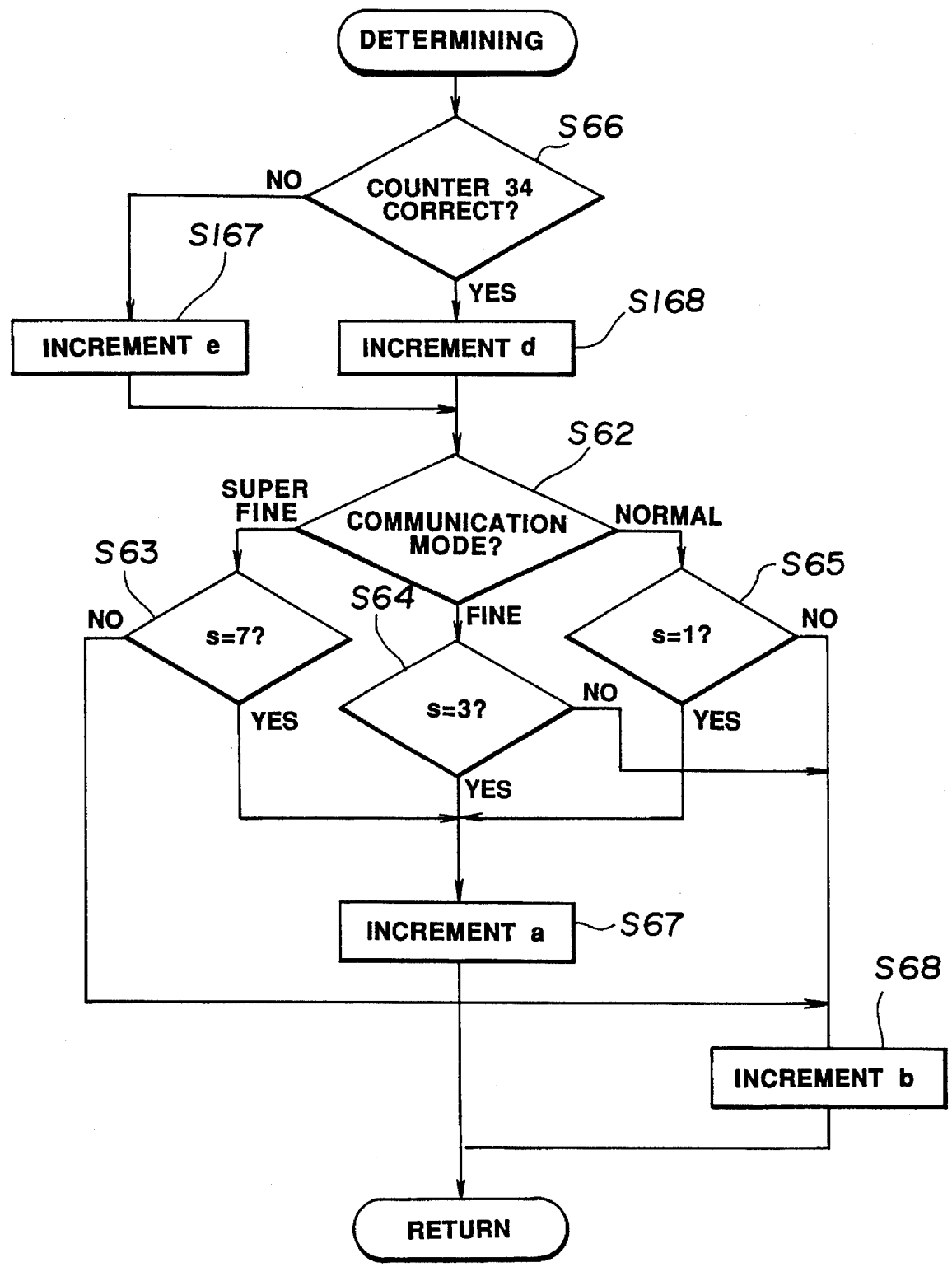
FIG. 10 is a flow chart showing a "determining" subroutine from step S28 in FIG. 8.

In step S66 of FIG. 10, the control circuit 36 discriminates if the count value of the counter 34 is the predetermined value or not.

In the case where the count value of the counter 34 is the predetermined value, the control circuit 36 increments the internal counter d in step S168. In the case where the count value of the counter 34 is not the predetermined value, the control circuit 36 increments the internal counter e in step S167. After step S167 or step 168, the control circuit 36 shifts to step S62. The predetermined value is, for example 1,728 for A4 paper and 2,048 for B4 paper.

The facsimile apparatus according to the second embodiment is able to determine the quality of the received image data more accurately than one according to the first embodiment.

Next, a facsimile apparatus according to a third embodiment will be described as follows.

Figure 11:
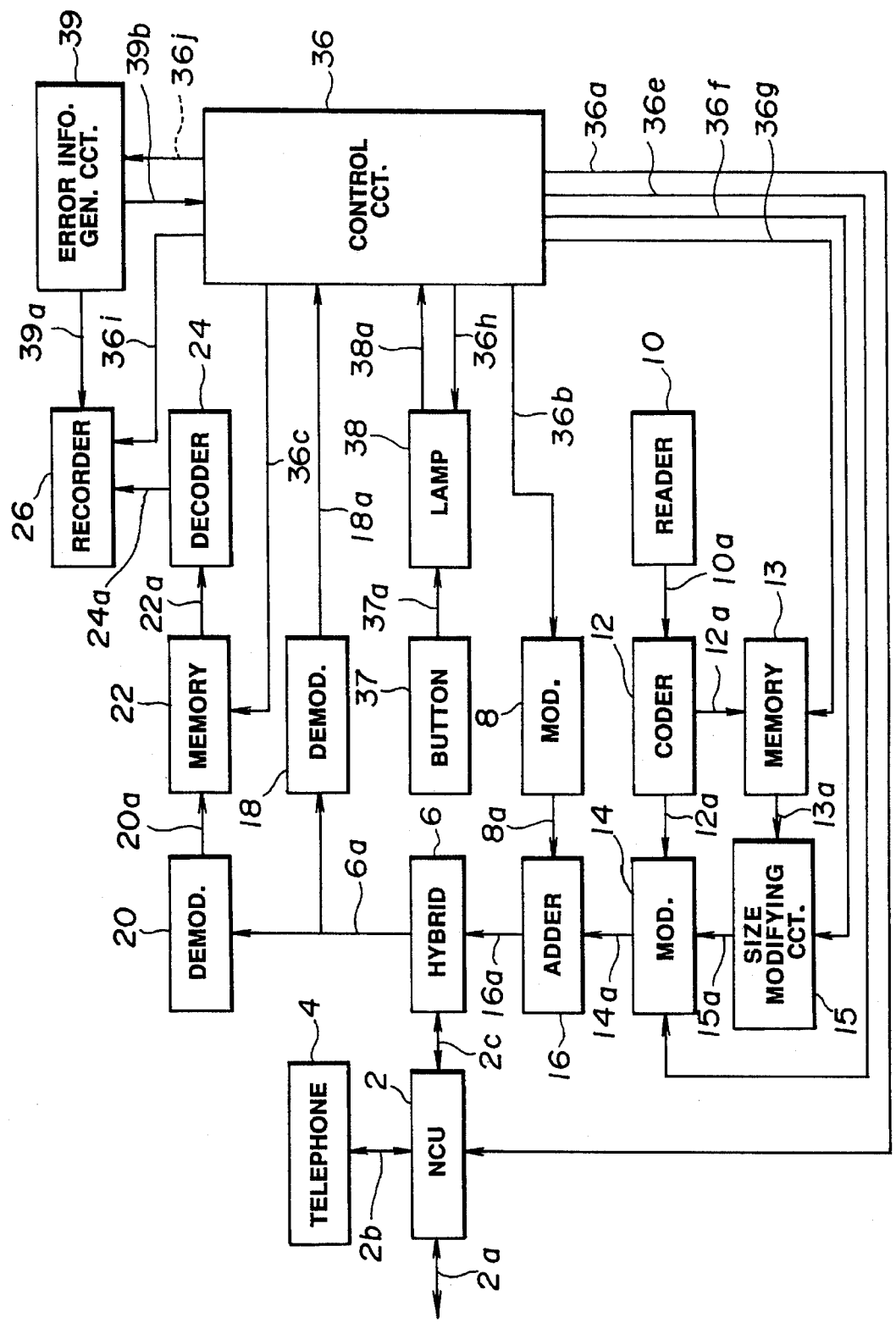
FIG. 11 is a block diagram of a facsimile apparatus according to a third embodiment.

FIG. 11 is a block diagram of the facsimile apparatus according to the third embodiment. In FIG. 11, the circuits which have the same functions as in FIG. 1 are identified with the same number, and explanations thereof are omitted.

A memory circuit 13 is provided for storing the coded data from the coding circuit 12 and outputting the stored data to a size modifying circuit 15 in accordance with a control signal from the control circuit 36.

The size modifying circuit 15 is provided for modifying a size of a main scanning direction of the coded data. The size modifying circuit 15 decodes the coded data, modifies the size of the decoded data, recodes the modified data, and then outputs the recoded data to the modulator 14. The modulator 14 selectively modulates the coded data from the coding circuit 12 or the coded data from the size modifying circuit 15 in accordance with a control signal from the control circuit 36.

Numeral 37 denotes a direct transmission button by which an operator manually selects a direct transmission mode.

A direct transmission lamp 38 is provided for indicating that the direct transmission mode is selected.

The direct transmission lamp 38 is turned off by a control pulse from the control circuit 36. The direct transmission lamp 38 sets a signal line 38a to be "1" while the lamp 38 is turned on, and sets the signal line 38a to be "0" while the lamp 38 is turned off.

An error page information generating circuit 39 is provided for generating information of error pages and outputting the information of error pages to the recording unit 26 line by line in response to a control signal from the control circuit 36. The error page information generating circuit 39 outputs a pulse to the control circuit 36 when the circuit 39 finishes outputting the information of error pages to the recording unit 26.

In the case where the facsimile apparatus receives image data which is not in the HDLC format, the control circuit 36 causes the memory circuit 22 to store one page of received image data, and then performs a process of checking for an error of the previous page stored in the memory circuit 22 and a process of recording the previous page while the control circuit 36 causes the memory circuit 22 to store a next page of received image data. The control circuit 35 sends information of the quality of the previous page to a destination (a transmitting machine) after finishing checking for an error of the previous page and finishing receiving the next page. Then, the control circuit 36 sends information of the quality of an end page to the destination after decoding the end page and checking for an error of the end page and finishing recording the end page.

Next, a control operation of the control circuit 36 according to the third embodiment in image reception will be described as follows.

FIG. 12 through FIG. 17 together form a flow chart showing the control operation of the control circuit 36.

The control circuit 36 initializes the relay CML of the NCU2 (S201), sets the modulator 14 to input the coded data from the coding circuit 12 (S202), initializes the recording unit 26 (S203), and then turns off the direct transmission lamp 38 (S204).

The control circuit 36 discriminates whether image transmission or image reception has been selected (S205). In the case where the image transmission has been selected, the control circuit 36 discriminates whether the direct transmission mode has been selected or not (S206). If the direct transmission mode has been selected, the control circuit 36 performs a control operation of direct transmission (FIG. 15) in step S207, and then return to step S201. If the direct transmission mode has not been selected, the control circuit 36 performs another process (S208), and then returns to step S201.

On the other hand, in the case where the image reception mode has been selected, the control circuit 36 turns on the CML relay of the NCU 2 (S209), and performs a pre-procedure 1 by which the facsimile apparatus sets a communication mode (S210). In the pre-procedure 1, the facsimile apparatus informs the destination of information indicating what functions the facsimile apparatus has (including a function according to the third embodiment which is to inform the destination of the quality of the previous page after receiving the next page).

In step S211, the control circuit 36 discriminates whether ECM (Error Correction Mode) communication or G3 communication has been selected in the pre-procedure. IN the case where ECM communication has been selected, the control circuit 36 performs a process of ECM reception/recording (S212), and then returns to step S201. On the other hand, in the case where G3 communication has been selected, the control circuit 36 discriminates whether the destination (the transmitting machine) has a function which corresponds to the function of informing the quality of the previous page at the end of receiving the next page or not (S213), i.e. whether it can respond to this information. If the destination has the function, the control circuit 36 performs a receiving operation 1 of FIG. 13 (S214) and then returns to step S201. If the destination does not have the function, the control circuit 36 performs a receiving operation 2 of FIG. 14 (S215), and then returns to step S201.

Next, the receiving operation 1 will be described as follows.

Figure 13:
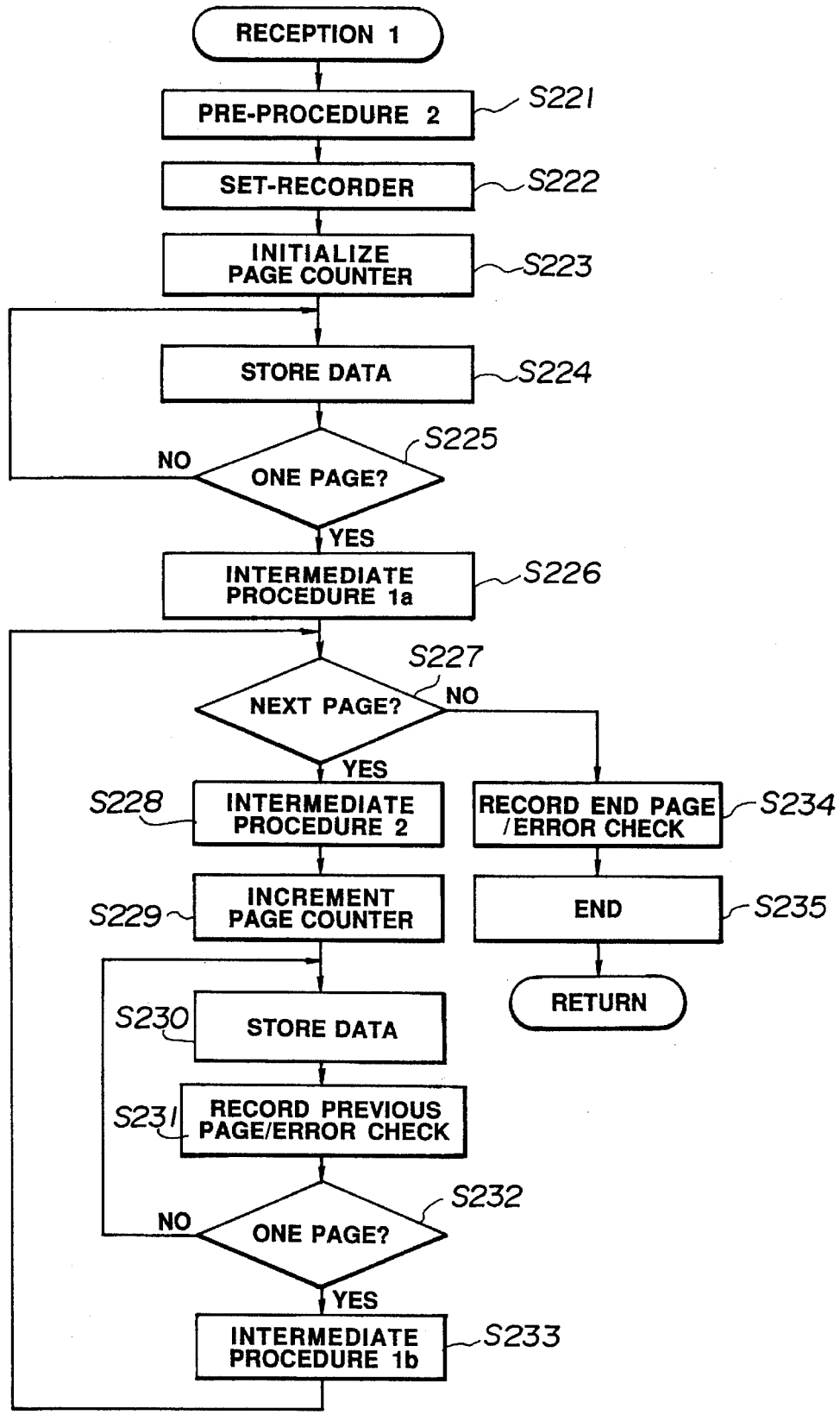
FIG. 13 is a flow chart showing a "reception 1" subroutine from step S214 in FIG. 12.

In step S221 of FIG. 13, the control circuit 36 performs a pre-procedure 2. The pre-procedure 2 is a process following the pre-procedure 1 of step S210. Then the control circuit 36 allows the recording unit 26 to record received image data (S222), and initializes an internal page counter (S223). The control circuit 36 stores received image data into the memory circuit 22 (S224), and discriminates if image data corresponding to one page has been received or not (S225). The control circuit 36 performs the process of steps S224 and steps S225 until image data corresponding to one page has been received.

After image data corresponding to one page has been received, the control circuit 36 performs an intermediate procedure 1a (S226). In the intermediate procedure 1a, the control circuit 36 does not inform the destination of information of the quality of the received image data.

Next, the control circuit 36 discriminates if image data corresponding to a next page will be received or not (S227). In the case where image data corresponding to the next page will be received, the control circuit 36 performs an intermediate procedure 2 (S228). The intermediate procedure 2 is a process following the intermediate procedure 1a of step S226. Then the control circuit 36 increments the internal page counter (S229), stores received image data into the memory circuit 22 (S230), causes the decoding circuit 24 to decode the coded image data corresponding to the previous page and causes the recording unit 26 to record decoded image data at a fixed speed while it performs a process of checking for an error (S231). The previous page is a page corresponding to a value which is 1 less than the count value of the internal page counter.

Then, the control circuit 36 discriminates if image data corresponding to one page has been received or not (S232). In the case where image data corresponding to one page has not been received, the control circuit 36 shifts from step S232 to step S231. In the case where image data corresponding to one page has been received, the control circuit 36 performs an intermediate procedure 1b (S233). In the intermediate procedure 1b, the control circuit 36 informs the destination of information of the quality of the previous page in accordance with the result of checking for an error in step S231.

On the other hand, in the case where image data corresponding to a next page is not to be received, the control circuit 36 causes the decoding circuit 24 to decode the coded image data corresponding to an end page and causes the recording unit 26 to record the decoded image data and performs the process of checking for an error (S234).

Figure 12:
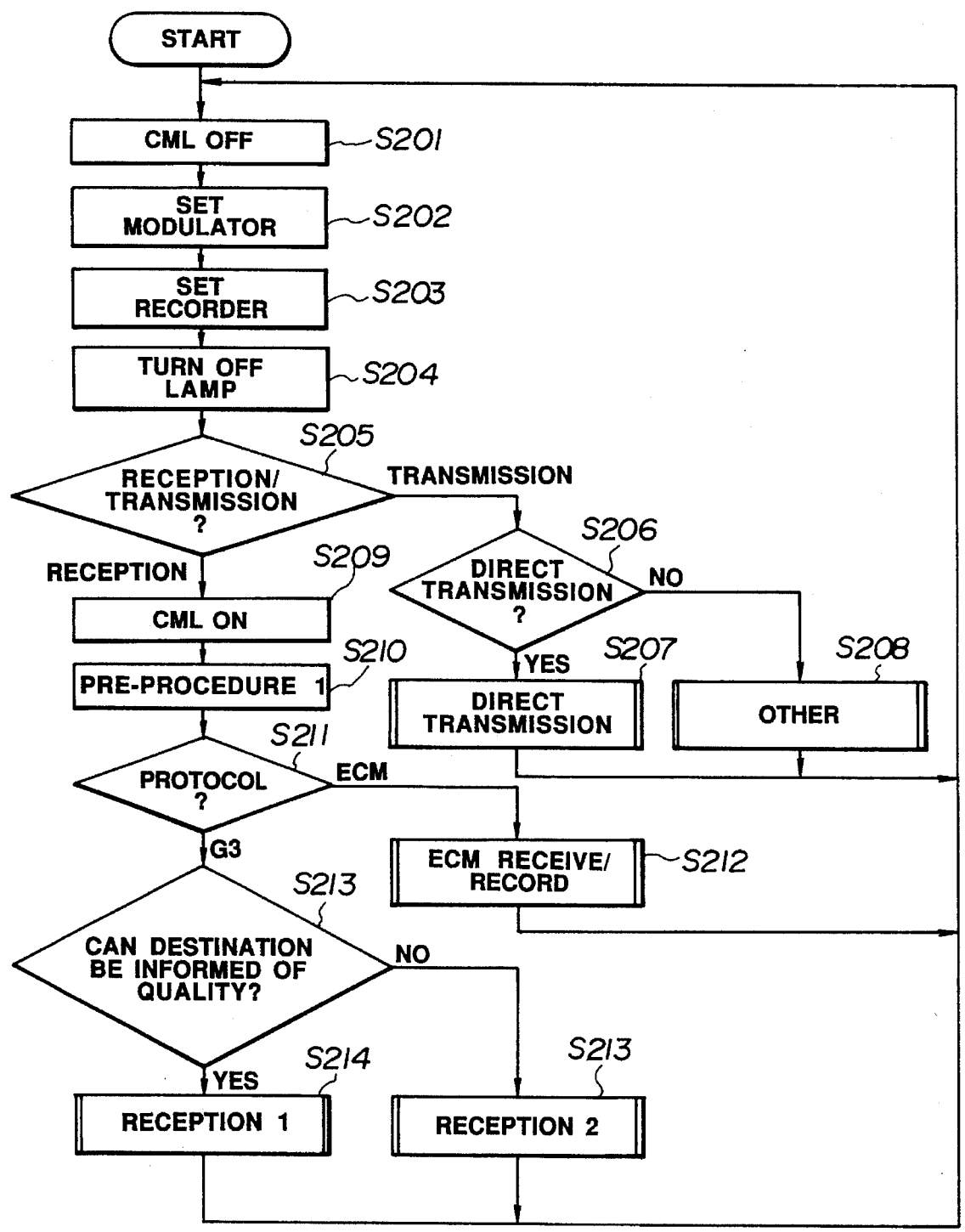
FIG. 12 is a flow chart showing a control operation according to the third embodiment.

Next, the control circuit 36 performs an end procedure (S235), and then returns to step S201 of FIG. 12. In the end procedure, the control circuit 36 informs the destination of information of the quality of the end page in accordance with the result of checking for an error.

Next, the receiving operation 2 will be described as follows.

Figure 14:
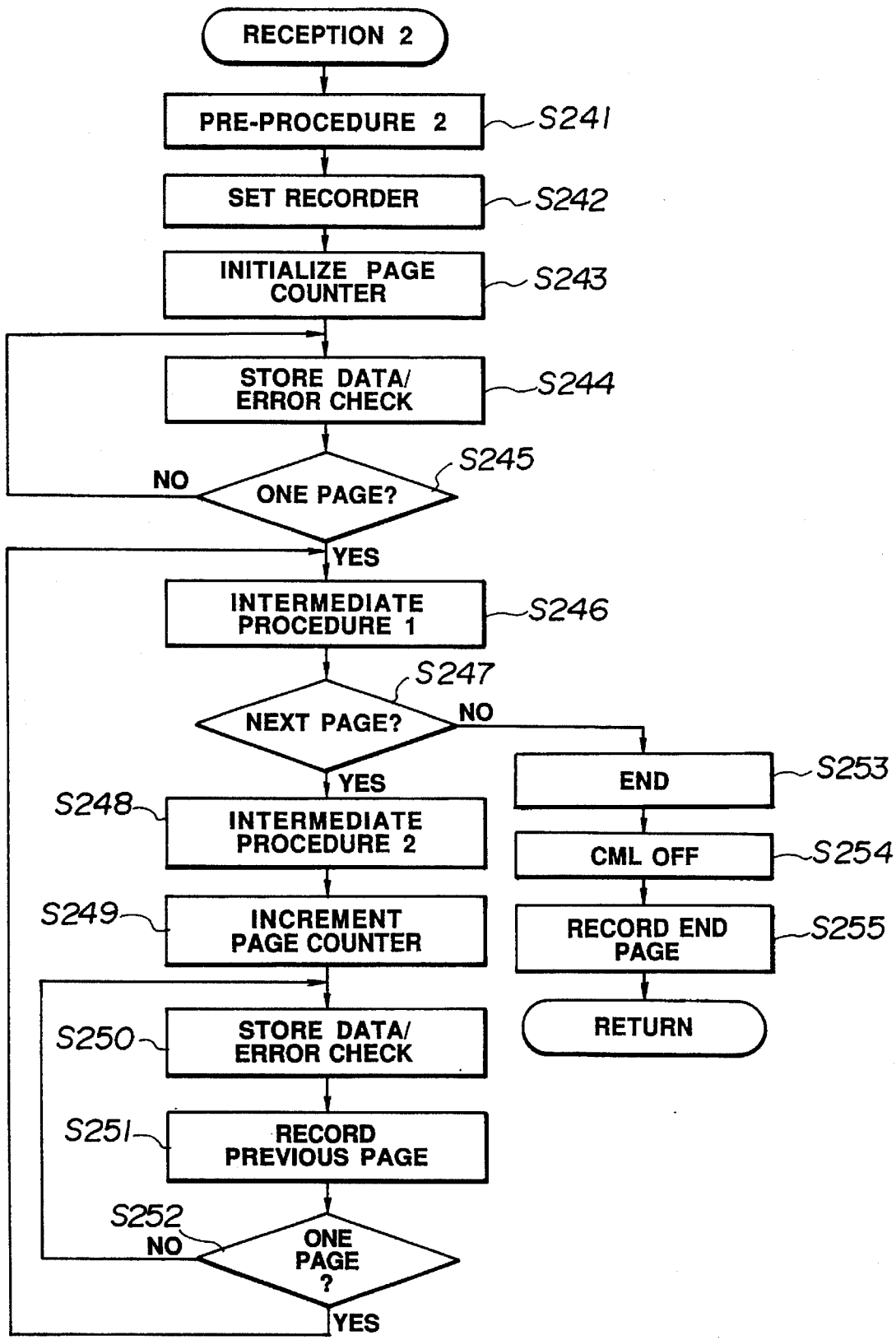
FIG. 14 is a flow chart showing a "reception 2" subroutine from step S215 in FIG. 12.

In step S241 of FIG. 14, the control circuit 36 performs the pre-procedure 2. Then the control circuit 36 allows the recording unit 26 to record received image data (S242), and initializes the internal page counter (S243). The control circuit 36 stores received image data into the memory circuit 22 and performs the process of checking for an error (S244), and discriminates whether image data corresponding to one page has been received or not (S245). The control circuit 36 performs the process of step S244 until image data corresponding to one page is received.

In the case where the image data corresponding to one page has been received, the control circuit 36 performs an intermediate procedure 1 (S246). In the intermediate procedure 1, the control circuit 36 informs the destination of information of the quality of the received page in accordance with a result of checking for an error in step S244.

Then the control circuit 36 discriminates whether image data corresponding to a next page will be received or not (S247). In the case where the image data corresponding to the next page will be received, the control circuit 36 performs an intermediate procedure 2 (S248). The intermediate procedure 2 is a process following the intermediate procedure 1 of step S246.

Next, the control circuit 36 increments the internal page counter (S249), and then stores received image data into the memory circuit 22 and checks if the received image data includes error data or not (S250). Then, the control circuit 36 causes the recording unit 26 to record the image data corresponding to the previous page in the memory circuit 22 (S251), and discriminates whether image data corresponding to one page has been received or not (S252). In the case where the image data corresponding to one page has been received, the control circuit 36 shifts from step S252 to step S246. In the case where image data corresponding to one page has not been received, the control circuit 36 shifts from step S252 to step S250.

On the other hand, in the case where image data corresponding to a next page is not to be received, the control circuit 36 performs an end procedure (S253), and turns off the CML relay of the NCU2 (S254).

The control circuit 36 causes the decoding circuit 24 to decode the coded image data corresponding to the end page, causes the recording unit 26 to record decoded image data (S255), and then returns to step S201 of FIG. 12.

Next, the process of the direct transmission of step S206 will be described in detail as follows.

Figure 15:
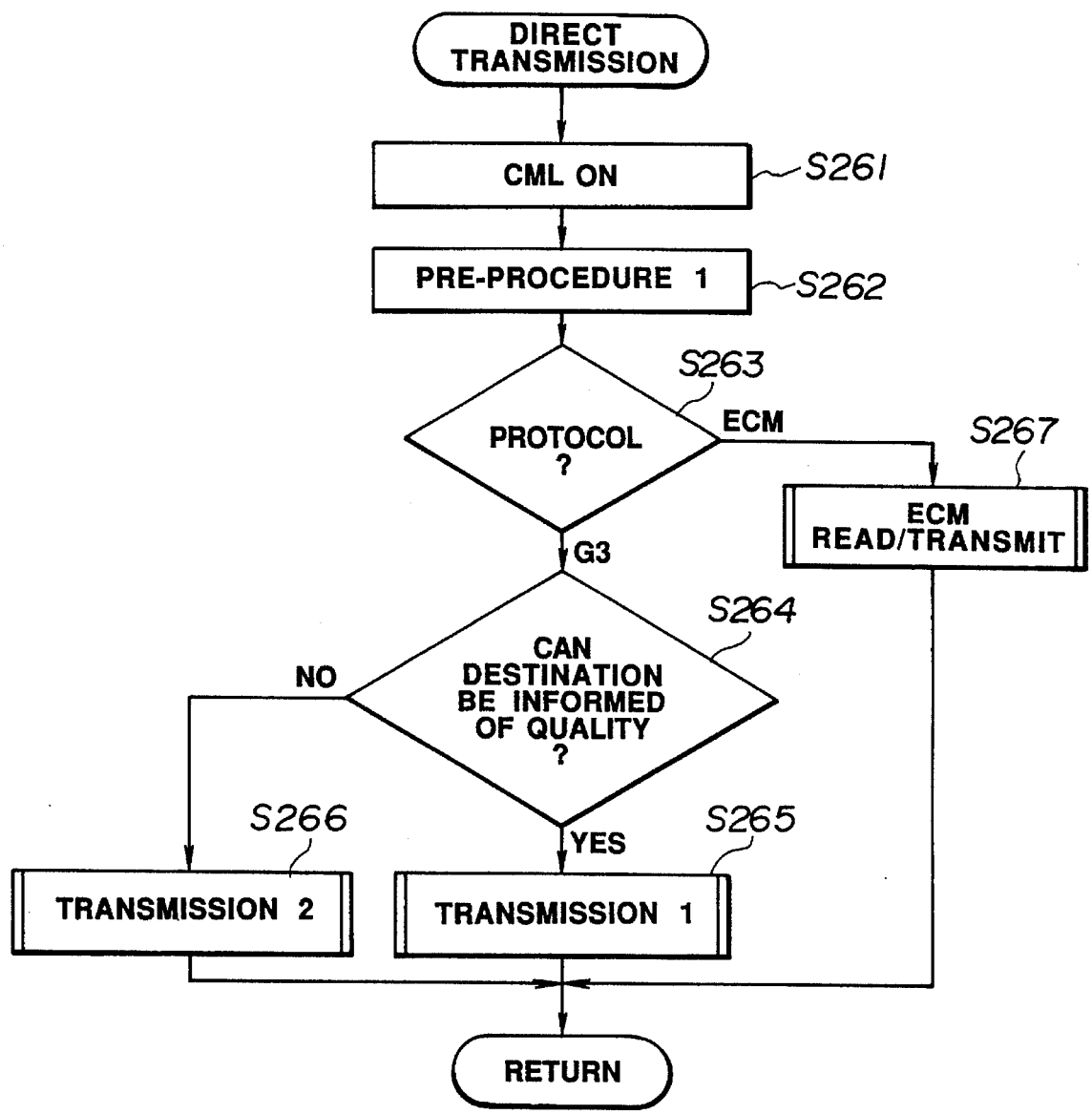
FIG. 15 is a flow chart showing a "direct transmission" subroutine from step S207 in FIG. 12.

In step S261 of FIG. 15, the control circuit 36 turns on the CML relay of the NCU 2. Then, the control circuit 36 performs a pre-procedure 1 (S262), and discriminates whether a communication protocol to be effected is the G3 mode or the ECM mode (S263). In the case where the communication protocol is the ECM mode, the control circuit 36 performs processes of reading and transmitting image data according to the ECM mode (S267), and then returns to step S201 of FIG. 12.

On the other hand, in the case where the communication protocol is the G3 mode, the control circuit 36 discriminates whether a destination (a receiving machine) has a function corresponding to the third embodiment or not (S264). If the destination has the function, the control circuit 36 performs a transmitting operation of FIG. 16 (S265), and then returns to step S201 of FIG. 12. If the destination does not have the function, the control circuit 36 performs a transmitting operation 2 of FIG. 17 (S266), and then returns to step S201 of FIG. 12.

Next, the transmitting operation 1 will be described as follows.

Figure 16:
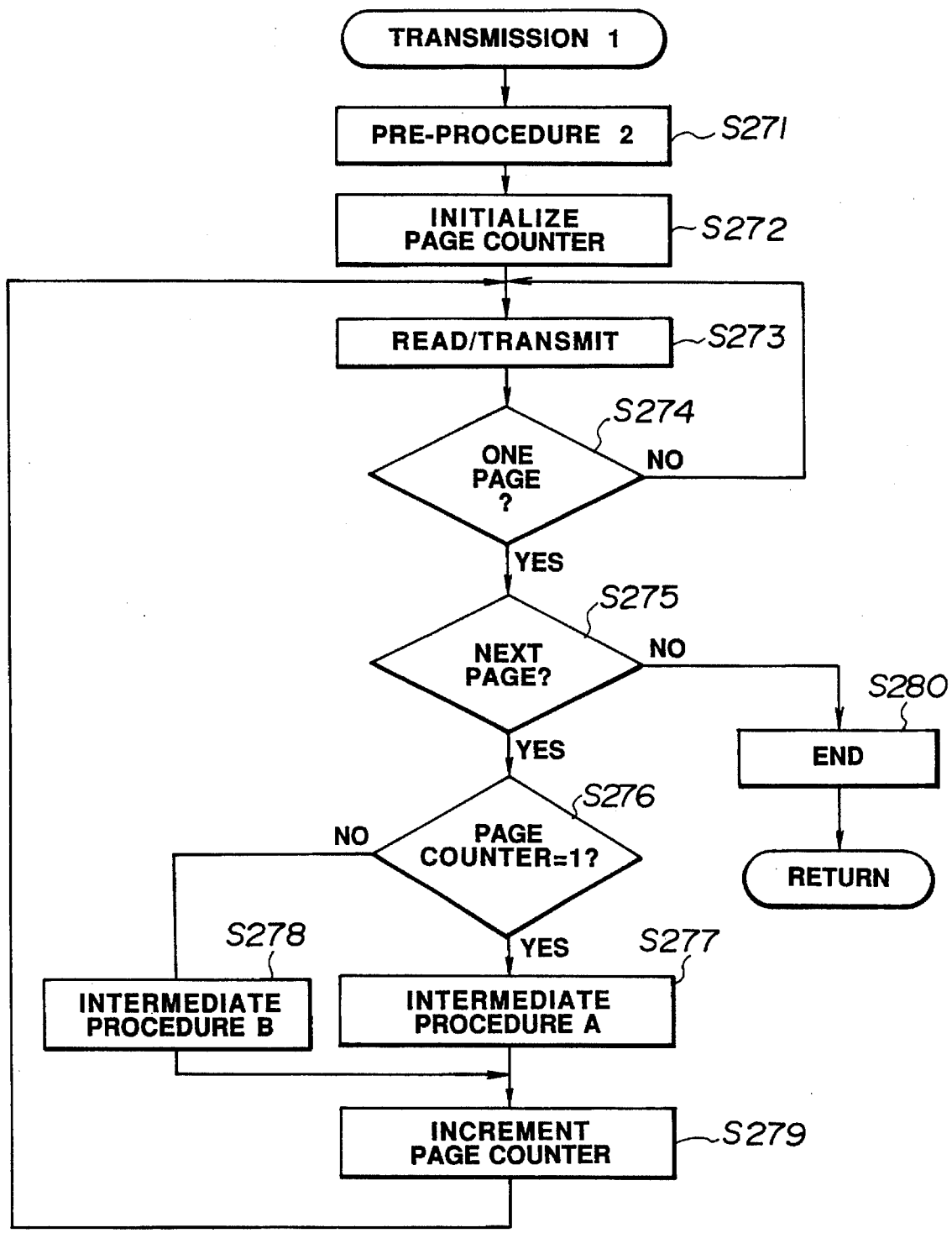
FIG. 16 is a flow chart showing a "transmission 1" subroutine from step S265 in FIG. 15.

In step S271 of FIG. 16, the control circuit 36 performs a pre-procedure 2. The pre-procedure 2 is a process following the pre-procedure 1 of step S262.

The control circuit 36 initializes the internal page counter (S272), and then causes the reading unit 10 to read an image of a document set in the reading unit 10 and transmits the image data read by the reading unit 10 to the destination (S274). The control circuit 36 discriminates whether image data of one page has been transmitted or not (S274). If image data of one page has not been transmitted, the control circuit 36 continues to transmit read image data. If image data of one page has been transmitted, the control circuit 36 discriminates whether a next page is set in the reading unit 10 or not (S275). In the case where a next page is not set, the control circuit 36 performs an end procedure (S280), and then returns to step S201 of FIG. 12. In the case where the next page is set, the control circuit 36 discriminates whether the count value of the internal page counter is "1" or not (S276). If the count value of the internal page counter is "1", the control circuit 36 performs an intermediate procedure A (S277). If the count value of the internal page counter is not "1", the control circuit 36 performs an intermediate procedure B (S278). The control circuit 36 increments the internal page counter (S279), and then returns to step S273. In the intermediate procedure A of step S277, the control circuit 36 does not receive information of the quality of transmitted image data from the destination. In the intermediate procedure B of step S278, the control circuit 36 receives information of the quality of transmitted image data from the destination, and stores the received information and data of the page number (equal to the count value of the internal page counter minus 1) into an internal memory of the control circuit 36.

In the end procedure of step S280, the control circuit 36 waits for information of the quality of transmitted image data from the destination to be received, and stores the information and the page number corresponding to the information into the internal memory of the control circuit 36.

Next, the transmitting operation 2 will be described as follows.

Figure 17:
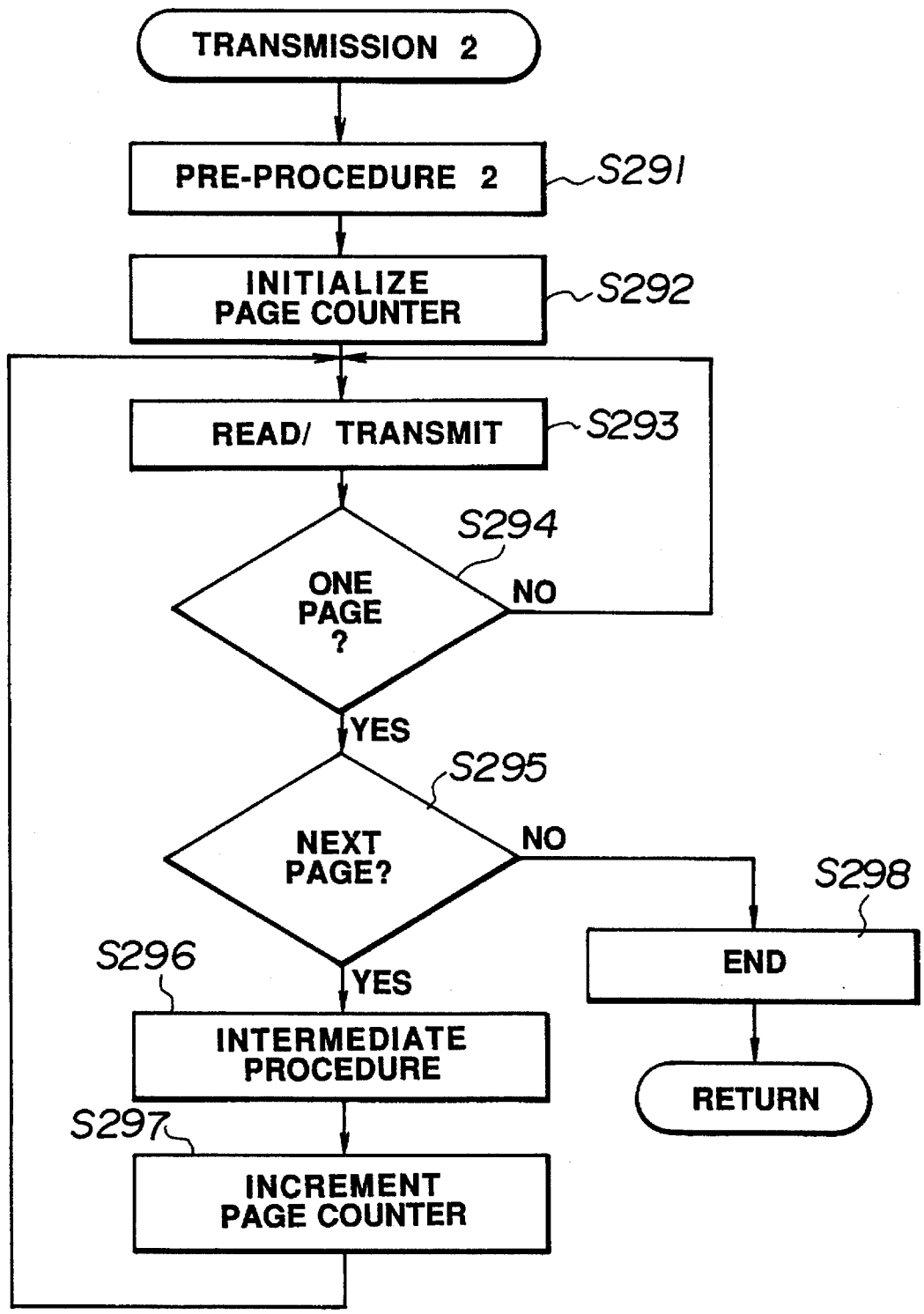
FIG. 17 is a flow chart showing a "transmission 2" subroutine from step S266 in FIG. 15.

In step S291 of FIG. 17, the control circuit 36 performs the pre-procedure 2. The control circuit 36 initializes the internal page counter (S292), and then causes the reading unit 10 to read the document set in the reading unit 10 and transmits the image data read by the reading unit 10 to the destination (S293). The control circuit 36 discriminates whether image data of one page has been transmitted or not (S294). In the case where the image data of one page has been transmitted, the control circuit 36 discriminates whether a next page is set in the reading unit 10 or not (S295). In the case where the next page is set, the control circuit 36 performs an intermediate procedure (S296), increments the internal page counter (S297), and then returns to step S293. In the case where a next page is not set, the control circuit 36 performs an end procedure (S298), and then returns to step S201 of FIG. 12.

In the intermediate procedure of step S296 and the end procedure of step S298, the control circuit 36 waits for information of the quality of transmitted image data from the destination to be received, and stores the information and the page number corresponding to the information (the count value of the internal page counter) into the internal memory of the control circuit 36.

In the case where the facsimile apparatus performs the transmitting operation mentioned above, the control circuit 36 uses the information stored in the internal memory of the control circuit 36 when the apparatus prints a report of a communication result, etc.

As above mentioned, the facsimile apparatus according to the third embodiment determines the quality of received image data in accordance with decoded image data for recording, and informs the destination of a result of determining after receiving image data of the next page. Thereby the facsimile apparatus does not need to decode received image data for determining the quality, and only decodes the received image data for recording.

In the third embodiment mentioned above, the facsimile apparatus finishes recording image data of the previous page before finishing receiving image data of one page. But the facsimile apparatus according to the third embodiment might finish receiving image data of one page before finishing recording image data of the previous page.

In the third embodiment mentioned above, the facsimile apparatus informs the destination of information of the quality of received image data at the time it finishes receiving image data of one page. But the facsimile apparatus according to the third embodiment might inform the destination of information of the quality of all the received image data after finishing receiving the image data of the end page. This is accomplished by modifying the control operation shown in FIG. 13 and FIG. 16 as follows.

(1) In the intermediate procedure 1b of step S233 of FIG. 13, the control circuit 36 does not inform the destination of the information of the quality.

(2) In the end procedure of step S235 of FIG. 13, the control circuit 36 informs the destination of information of the quality of all pages.

(3) The process of step S276 and the process of step S278 in FIG. 16 are deleted.

(4) In the end procedure of step S280 of FIG. 16, the control circuit 36 waits for information of the quality corresponding to all pages to be received, and stores the information and data of the page number into the internal memory of the control circuit 36.

In the case where a memory transmission is selected, the facsimile apparatus keeps the read image data in the memory circuit 13 and resends image data of the memory circuit 13 corresponding to data of an error page from the destination.

Further, the facsimile apparatus according to the third embodiment might add a message for indicating an error page, which is edited by the generating circuit 39, to recorded image data of the error page.

Further, the facsimile apparatus according to the present invention might be structured as plural devices or as one apparatus.

Further, the present invention is applicable to a system or an apparatus, to which a program for controlling is supplied.

Although particular embodiments of the present invention are herein disclosed for purposes of explanation, various modification thereof, after study of this specification, will be apparent to those skilled in the art to which the invention pertains.

We claim:

1. An image communication apparatus comprising:

means for receiving image data;

first detecting means for detecting a line synchronizing signal of a first type corresponding to one-dimensional codes in received image data;

second detecting means for detecting a line synchronizing signal of a second type corresponding to two-dimensional codes in the received image data; and determining means for counting a number of the second-type line synchronizing signals detected by said second detecting means in accordance with a detection by said first detecting means, and for determining a quality of the received image data in accordance with the number of the second-type line synchronizing signals.

2. An image communication apparatus according to claim 1, further comprising decoding means for decoding image data coded on the basis of a one-dimensional coding method, wherein said determining means determines the quality of the received image data in accordance with the number of the second, type line synchronizing signals and a number of bits decoded by said decoding means.

3. An image communication apparatus according to claim 1, wherein said determining means counts the number of the second-type line synchronizing signals detected between one first-type line synchronizing signal and a next first-type line synchronizing signal.

4. An image communication apparatus according to claim 3, wherein said determining means determines a ratio calculated from a first number of times the number of the second-type line synchronizing signals has a correct value and a second number of times the number of the second-type line synchronizing signals has an incorrect value, and determines the quality of the received image data in accordance with the ratio.

5. An image communication apparatus according to claim 4, wherein said first number of times is a, said second number of times is b, and said ratio is $b/(a+b)$.

6. A method of determining a quality of image data coded on the basis of a two-dimensional coding method, comprising the steps of:

detecting a line synchronizing signal of a first-type corresponding to one-dimensional codes included in the image data, detecting a line synchronizing signal of a second-type corresponding to two-dimensional codes included in the image data, counting a number of detected second-type line synchronizing signals between one first-type line synchronizing signal and a next first-type line synchronizing signal, and determining the quality of the image data in accordance with the number of the second-type line synchronizing signals.

7. A method according to claim 6, wherein said determining step discriminates whether the number of the detected second-type line synchronizing signals between the one first-type line synchronizing signal and the next first-type line synchronizing signal is correct if it equals a predetermined value or not, and determines the quality of the image data on the basis of a ratio calculated from a number of times the number is correct and a number of times the number is not correct.

8. A method according to claim 6, further comprising a decoding step of decoding one-dimensional codes included in the image data, wherein said determining step determines the quality of the image data in accordance with the number of second-type line synchronizing signals and a number of bits decoded in said decoding step.

* * * * *

UNITED STATES PATENT AND TRADEMARK OFFICE
CERTIFICATE OF CORRECTION

PATENT NO. : 5,526,123
DATED : June 11, 1996
INVENTOR(S) : TAKEHIRO YOSHIDA ET AL.

It is certified that error appears in the above-identified patent and that said Letters Patent is hereby corrected as shown below:

COLUMN 3

Line 57, "A EOL-MR" should read --An EOL-MH--.
Line 66, "A" should read --An-- and
(2nd occur), "detecting" should read --for detecting--.

COLUMN 5

Line 48, "them" should read --then--.

COLUMN 6

Line 12, "(25)." should read --(S25).--.
Line 19, "the" should read --to--.

COLUMN 8

Line 62, "step 168," should read --step S168,--.

UNITED STATES PATENT AND TRADEMARK OFFICE
CERTIFICATE OF CORRECTION

PATENT NO. : 5,526,123
DATED : June 11, 1996
INVENTOR(S) : TAKEHIRO YOSHIDA ET AL.    Page 2 of 2

It is certified that error appears in the above-identified patent and that said Letters Patent is hereby corrected as shown below:

<u>COLUMN 14</u>

Line 38, "second, type" should read --second-type--.

Signed and Sealed this

Twenty-ninth Day of October 1996

Attest:

BRUCE LEHMAN

Attesting Officer    Commissioner of Patents and Trademarks